United States Patent [19]
Bennington

[11] 3,870,059
[45] Mar. 11, 1975

[54] DENTAL FLOSS DISPENSER

[76] Inventor: William E. Bennington, 5 Fillmore Dr., Sarasota, Fla. 33578

[22] Filed: Mar. 22, 1974

[21] Appl. No.: 453,972

Related U.S. Application Data

[63] Continuation-in-part of Ser. No. 215,532, Jan. 5, 1972, and Ser. No. 54,254, July 13, 1970.

[52] U.S. Cl................................................ 132/92 A
[51] Int. Cl.............................................. A61c 5/00
[58] Field of Search............ 132/92 A, 92 R, 89, 91

[56] References Cited
UNITED STATES PATENTS
1,260,011    3/1918    Muchow .......................... 132/92 R
1,512,633    10/1924    Peckham .......................... 132/92 A

*Primary Examiner*—G. E. McNeill
*Attorney, Agent, or Firm*—Millen, Raptes & White

[57] ABSTRACT

This invention relates to a spool-type dental floss dispenser comprising a body portion containing a retaining cell for a spool of dental floss and an elongated finger portion from which the floss is dispensed. The floss is threaded through a bore hole in the dispenser from the retaining cell into the finger portion and out an end thereof. Brake means are provided to control the floss during use and withdrawing thereof.

1 Claim, 4 Drawing Figures

DENTAL FLOSS DISPENSER

This application is a continuation-in-part of copending application Ser. No. 215,532, filed Jan. 5, 1972 and application Ser. No. 54,254, filed July 13, 1970 now abandoned.

This invention relates to an improved dental floss holder and dispenser. More particularly, it relates to a spool-type dispenser having ease of handling and use and providing a simplified construction.

Various dispensers have been available for dental floss and the like. However, with the conventional types, it is difficult to hold the dental floss in tension during use, without comparatively complicated means which increase the cost of the dispenser.

An object of this invention is to provide a dental floss dispenser having ease of handling and use and a simplified construction.

Another object of this invention is to provide a dental floss dispenser having an extended finger which can be inserted into the mouth of the user and which can have dental floss dispensed therefrom without the need for inserting the hands into the mouth.

Another object of this invention is to provide a dental floss dispenser which has means for holding the dental floss under tension during use.

A further object of this invention is to provide a dental floss dispenser having a spool-type reservoir of dental floss having means for easy threading of the floss through the dispenser.

Another object of this invention is to provide a dental floss dispenser having accurate control of the amount of dental floss dispensed along with positive holding action of the floss during use thereof.

Other features and advantages of the invention will appear from the following detailed description of specific embodiments thereof taken in connection with the drawings wherein.

Figure 1:
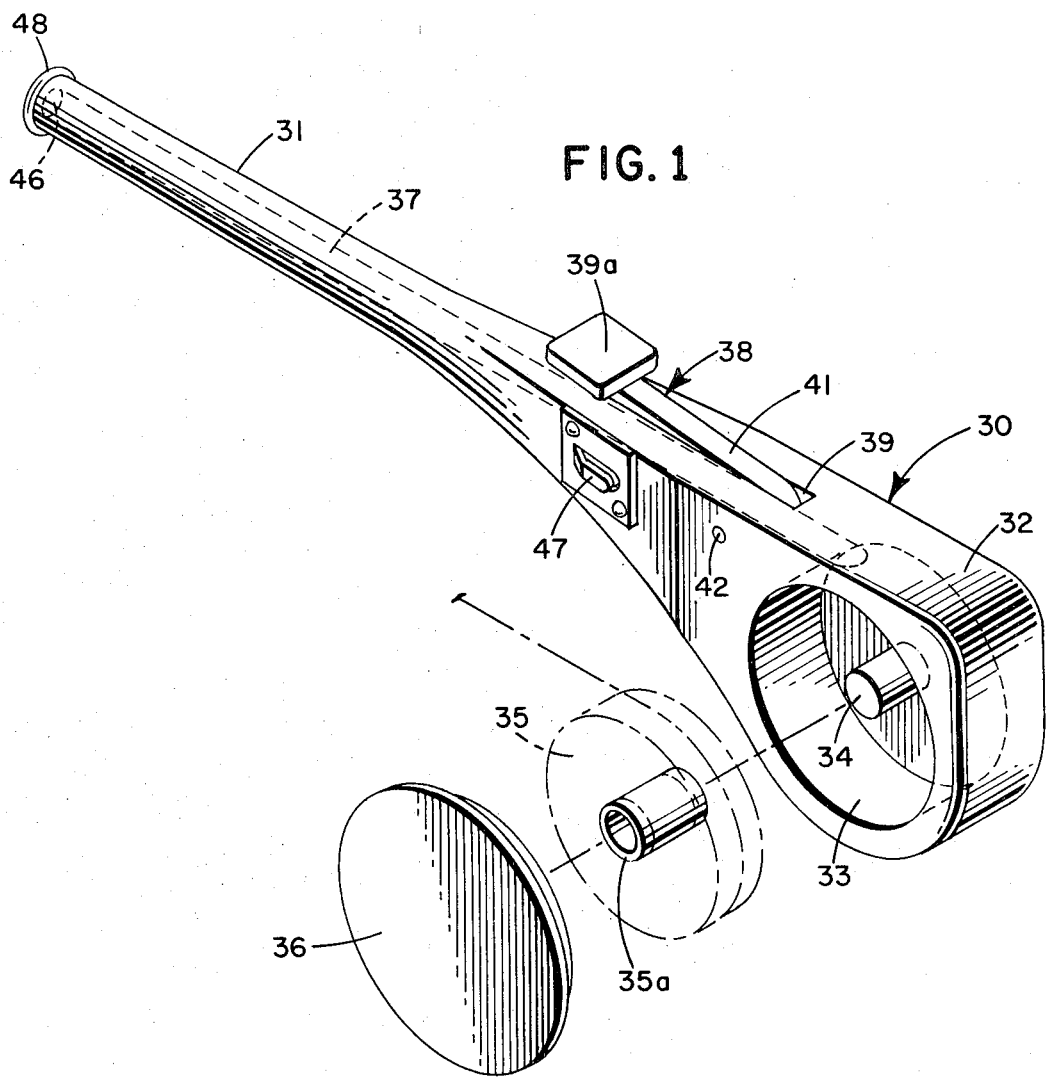
FIG. 1 is a perspective view of the dental floss dispenser of this invention.
Figure 4:
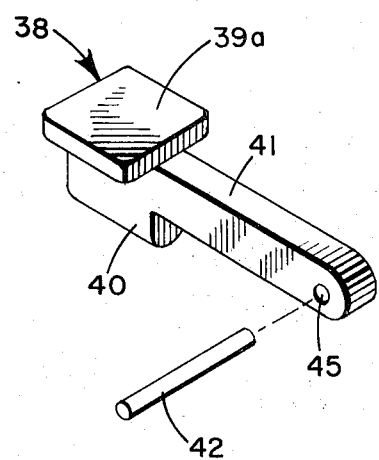
FIG. 4 is a detail showing the braking mechanism of the dispenser.
Figure 2:
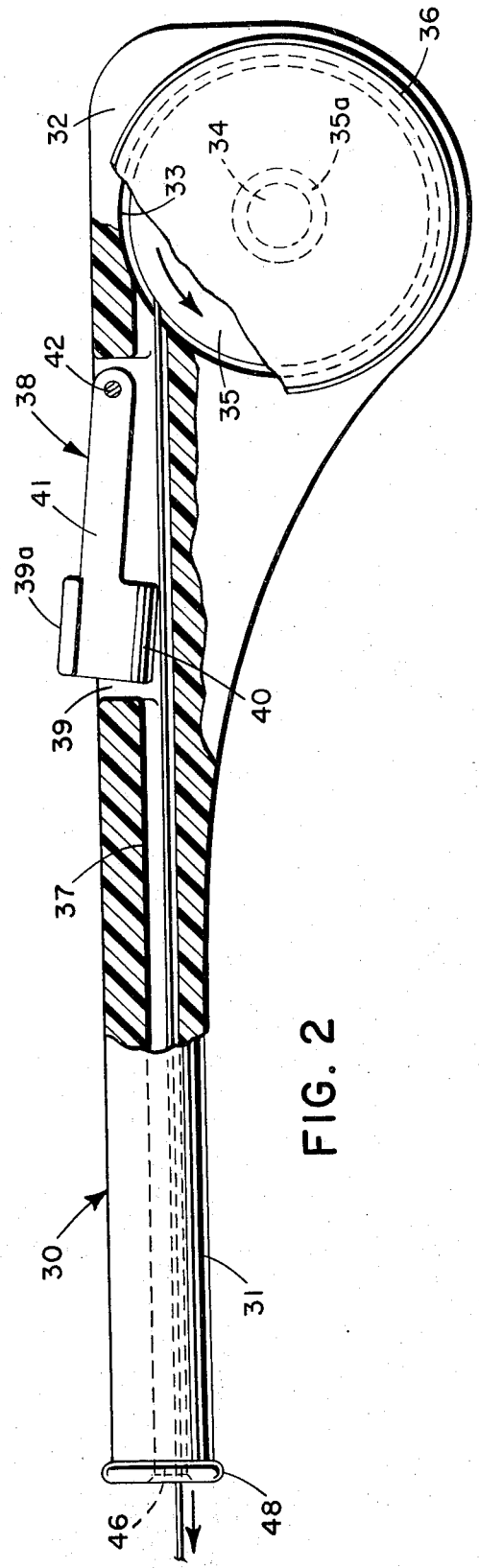
FIG. 2 is a side elevational view of the dispenser.
Figure 3:
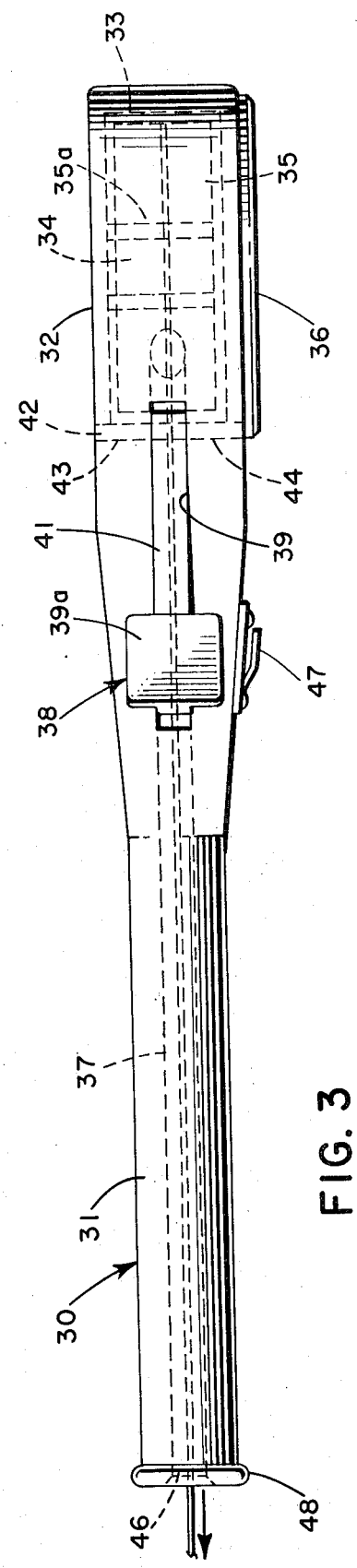
FIG. 3 is a top plan view of the dispenser.

The dental floss dispenser 30 is a unitary body comprising an extended finger section 31 and a spool section 32. The dispenser can be made from an injection moldable plastic material as a throwaway model or from a metal, such as stainless steel, as a more permanent type model for use by dentists, etc.

The spool section 32 comprises a retaining cell 33 and a rod 34 over which a spool of dental floss 35 contained on a reel 35a can be fitted. A cap 36 fits into the side of the cell 33 to retain the floss therein.

The dental floss passes from the retaining cell 33 through a bore hole 37 which extends through the body of the dispenser and exits at opening 46 of finger 31. The end of the finger 31 comprises an annular smooth flange 48. A cutter 47 is provided on the dispenser near the brake mechanism.

A braking means 38 is provided to fit into the top of the dispenser in an elongated slit 39 which extends into bore hole 37. Brake means 38 comprises a flat head portion 39a integral with a downwardly projection 40 which fits into the forward portion of slit 39. An integral elongated member 41 also fits into slit 39. projection 40 extends below member 41 in slit 39. The braking means 38 is pivotally connected within the slit 39 by a pivot pin 42 fitted through holes 43 and 44 in the top of the dispenser and at one end of the elongated through hole 45 in member 41.

The floss is threaded through bore hole 37 from the spool in cell 33 and out the opening 46. It is contemplated that threaders are to be used to thread the floss through the dispenser. Thus a flexible wire containing hook means such as an eye hook can be inserted first through opening 46 and bore hole 37 where the floss can be attached to the hook means and pulled through the bore hole out opening 46.

The dispenser is used by pulling a length of the floss (about two inches) from the hole 46, while at the same time releasing pressure of the thumb of the user on the head 39a of brake means 38 to permit the floss to be withdrawn. The braking means 38 acts somewhat as a braking device during withdrawal. When the desired amount of floss is withdrawn, the thumb is pressed on the head 39a which presses projection 40 against the floss in hole 37 to hold the floss taut during use. The finger 31 is inserted with one hand into the mouth and the end of the floss is gripped with the fingers of the other hand, thereby enabling the floss to be worked between the teeth without putting the fingers into the mouth. As the floss is used, the teeth will have a tendency to shred the floss. When this occurs, the thumb is again released from head 39a thereby releasing projection 40 from the floss and the floss pulled gently again to withdraw an additional length of floss. The used floss may be cut by bringing the floss under the cutter 47 and pulling sharply upward.

Although it is contemplated that the throwaway type dispenser will not require replacement of a spool of floss, in the permanent type dispenser, the empty spool may easily be replaced. This is done by removing the retaining cap 36, which may be of the screw type or press fit type. The used spool can then be removed and a full spool of floss be inserted and threaded through the dispenser.

It will be understood that modifications, within the scope of the appended claims, may be made in the design and arrangement of the parts without departing from the spirit of the invention.

What is claimed is:

1. A dental floss dispenser adapted to dispense a desired amount of dental floss comprising in combination, a finger section communicating with a spool section, a freely turnable spool of dental floss in said spool section and retaining cap means for retaining said spool in said spool section, a bore hole extending through said finger section and extending directly into said spool section through which said floss is threaded, longitudinal slit means in the top of said dispenser communicating with said bore hole, manually operable brake means disposed within said slit means adapted to frictionally engage said floss during use, said brake means comprising an elongated member, one end which is pivotally connected within said slit means, whereby said brake means are manually pivotable within said slit means, a head member at the opposite end of said brake means, said head member comprising an upper flat head portion integral with a downward projection adapted to be depressed within said slit means to frictionally engage an underportion thereof with said floss in said bore hole, whereby when said brake means are manually released a desired amount of floss can be freely pulled from the end of said finger section.

* * * * *